United States Patent
Chen et al.

(10) Patent No.: US 8,550,103 B2
(45) Date of Patent: Oct. 8, 2013

(54) UTILIZING SWELLABLE MATERIALS TO CONTROL FLUID FLOW

(75) Inventors: Kuo-Chiang Chen, Sugar Land, TX (US); Partha Ganguly, Woburn, MA (US); Dominique Guillot, Somerville, MA (US); Agathe Robisson, Cambridge, MA (US); Huilin Tu, Cambridge, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 920 days.

(21) Appl. No.: 12/262,868

(22) Filed: Oct. 31, 2008

(65) Prior Publication Data

US 2010/0108148 A1  May 6, 2010

(51) Int. Cl.
*F16K 17/14* (2006.01)

(52) U.S. Cl.
USPC .......... 137/67; 251/12; 166/250.12; 166/319; 166/373

(58) Field of Classification Search
USPC .............. 166/179, 319, 53, 250.12, 313, 373, 166/386, 191; 251/12; 137/67, 455
See application file for complete search history.

(56) References Cited

U.S. PATENT DOCUMENTS

| | | | |
|---|---|---|---|
| 3,921,719 A * | 11/1975 | McCollum ................ | 166/386 |
| 6,645,769 B2 * | 11/2003 | Tayebi et al. ................ | 436/56 |
| 6,648,076 B2 | 11/2003 | Broome | |
| 6,679,324 B2 | 1/2004 | Den Boer et al. | |
| 6,725,934 B2 | 4/2004 | Coronado et al. | |
| 6,976,542 B2 | 12/2005 | Henriksen et al. | |
| 7,059,415 B2 | 6/2006 | Bosma et al. | |
| 7,493,947 B2 | 2/2009 | Ross | |
| 7,506,658 B2 | 3/2009 | Guest et al. | |
| 7,597,152 B2 | 10/2009 | Wood et al. | |
| 7,665,538 B2 | 2/2010 | Robisson et al. | |
| 7,690,391 B2 | 4/2010 | Guest et al. | |
| 2003/0000706 A1 * | 1/2003 | Carstensen ................ | 166/373 |
| 2005/0252651 A1 | 11/2005 | Bosma et al. | |
| 2006/0124310 A1 * | 6/2006 | Lopez de Cardenas et al. ................ | 166/313 |
| 2007/0034255 A1 * | 2/2007 | Guest et al. ................ | 137/78.3 |
| 2007/0246225 A1 | 10/2007 | Hailey et al. | |
| 2008/0236843 A1 * | 10/2008 | Scott et al. ................ | 166/386 |
| 2009/0139710 A1 | 6/2009 | Robisson et al. | |
| 2009/0178808 A1 * | 7/2009 | Williamson et al. ......... | 166/297 |
| 2009/0194289 A1 * | 8/2009 | Clem ................ | 166/320 |
| 2009/0211759 A1 * | 8/2009 | East et al. ................ | 166/297 |

FOREIGN PATENT DOCUMENTS

| | | |
|---|---|---|
| EP | 1752690 A1 | 2/2007 |
| EP | 1762763 A1 | 3/2007 |
| EP | 1752690 B1 | 5/2008 |
| EP | 1762763 B1 | 5/2008 |
| RU | 2006122635 A | 1/2008 |

OTHER PUBLICATIONS

Dejnek et al, "Rare earth-doped glass microbarcodes", PNAS, vol. 100, No. 2, Jan. 2003, pp. 389-393.
Official Action of Russian Application No. 2011121816 dated Jul. 23, 2012: pp. 1-2.

* cited by examiner

Primary Examiner — Craig Schneider
Assistant Examiner — Ian Paquette
(74) *Attorney, Agent, or Firm* — Bridget Laffey; Rachel E. Greene; Jakub Michna (57) ABSTRACT

Methods and related systems are described for controlling inflow of fluid into a production string. In aspects, the invention provides an inflow control device with a shut-off feature that is operated automatically utilizing swellable materials.

17 Claims, 11 Drawing Sheets

UTILIZING SWELLABLE MATERIALS TO CONTROL FLUID FLOW

BACKGROUND OF THE INVENTION

1. Field of the Invention

This present invention relates to systems and methods for selective control of fluid flow into a production string in a wellbore. In particular aspects, the invention relates to devices and methods for actuating flow control valves in response to increased water or gas content in the production fluids obtained from particular production zones within a wellbore.

2. Background of the Invention

Wells can pass through various hydrocarbon bearing reservoirs or may extend through a single reservoir for a long distance. A technique to increase the production of the well is to perforate the well in a number of different zones, either in the same hydrocarbon bearing reservoir or in different hydrocarbon bearing reservoirs. During later stages of production of hydrocarbons from a subterranean production zone, water or gas often enters the production fluid, making production less profitable as the production fluid becomes increasingly diluted. For this reason, where there are several production zones along a wellbore, it is desired to close off inflow from those zones that are experiencing significant influx of water and/or gas. It is, therefore, important to have a means for controlling the inflow of fluid at a particular location along a production string.

Many different forms of valving arrangements are known for controlling liquid flow through a port or passageway. Such arrangements include the use of liquid swellable materials which enlarge with contact with a liquid to obstruct a passageway or port and which shrink when not in contact with a liquid to allow flow through the passageway or port. See United States publications US2007/0034255 and US 2007/0034817.

The structure and function of inflow control devices is well known. Inflow control devices currently lack an acceptable means for selectively closing off flow into the production tubing in the event that water and/or gas invade the production layer. For actuation, most inflow control devices require either enabling instrumentation disposed in the wellbore or a wellbore intervention. It would be desirable to have a mechanism for selectively closing the inflow control device.

The present invention address the problems of the prior art.

SUMMARY OF THE INVENTION

According to embodiments, a system and method for controlling inflow of fluid into a production string utilizing plural flow control devices to control fluid flow in respective zones of the well. In accordance with some embodiments of the invention, a fluid seal comprises: a swellable material capable of an expanded state and an unexpanded state; and wherein the swellable material is positioned such that the swellable material restricts fluid flow when the material comes in contact with a first type of fluid.

In accordance with another embodiment of the invention, apparatus actuated in response to fluids comprises: a swellable material capable of an expanded state and an unexpanded state; an actuator member and wherein the swellable material is positioned such that the swellable material actuates the actuator member when the material comes in contact with undesirable fluids.

In accordance with another embodiment of the invention, a method of triggering actuation of an actuator member in response to fluids comprises with: fluids causing a swellable material to move from an unexpanded state to an expanded state; and wherein the swellable material is positioned relative to the actuator member such that the swellable material actuates the actuator member when the material comes in contact with undesirable fluids An advantage of this invention is that it can be used to automate and control the detection of excess and undesirable fluid production from multiple zones in a single well. These flow control devices can shut-off the further production of undesirable fluids and transmit signals uphole to alert the operator of these shut-off's. The production of each zone can be controlled individually and tailored to its specific local conditions to optimize the total well productivity.

Further features and advantages of the invention will become more readily apparent from the following detailed description when taken in conjunction with the accompanying drawings.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PREFERRED EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice. Further, like reference numbers and designations in the various drawings indicate like elements.

The present invention generally relates to a system and method for controlling inflow of fluid into a production string utilizing plural flow control devices to control fluid flow in respective zones of the well.

Figure 1:
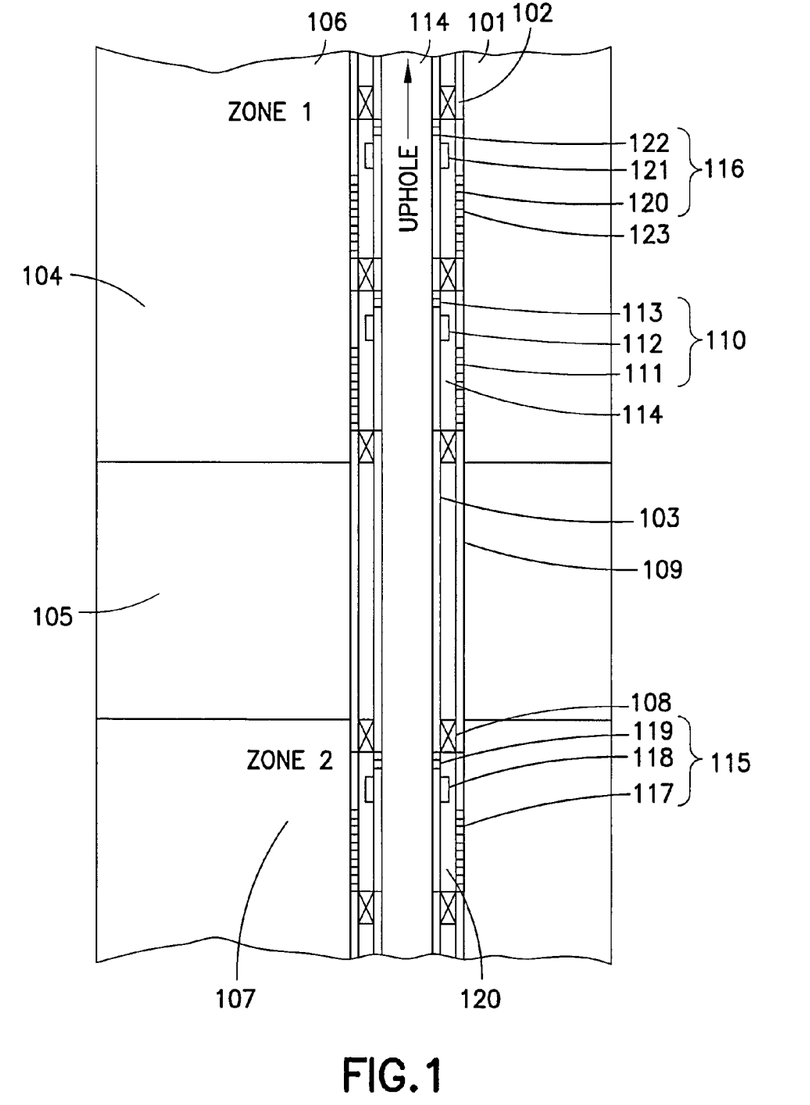
FIG. 1 is a side, cross-sectional view of an exemplary multi-zonal wellbore and production assembly which incorporates an inflow control system in accordance with the present invention.

Referring generally to FIG. 1, one embodiment of a well system is illustrated as utilizing plural flow control devices. In this embodiment, a well system 101 comprises production tubing 103 deployed in a wellbore 102. Although the wellbore in 102 is depicted in FIG. 1 as being a vertical wellbore, the wellbore 102 may be a lateral or horizontal wellbore in accordance with other embodiments of the system. The wellbore 102 is drilled into a subsurface formation 104 that may contain production fluids such as petroleum. In the example illustrated, wellbore 102 is lined with a casing 109. The wellbore 102 may also be an open wellbore in accordance with other embodiments of the system. The zones 106 and 107 are isolated from each other above and below by packers 108 in the wellbore 102 between zones, surrounding the production tubing 103, which is used to access the various zones 106 and 107. Within each zone are a number of inflow control devices 110, 115 and 116. These inflow control devices consist of a wellbore screen 111, 117 and 120 which control the inflow of solid particles into the wellbore 102, the wellbore screen 111, 117 and 120 comprising conduits 114, 120 and 123 for transport of the hydrocarbon fluid, the conduits 114, 120 and 123 being provided with a filter (not shown in the drawing) for reducing inflow of solid particles into the conduits 114, 120 and 123. In the embodiment illustrated, inflow control devices 110, 115 and 116 comprise primary flow control devices 112, 118 and 121 such as a valve capable of actuation and which provides a flow path for transport of the hydrocarbon through the port 113, 119 and 122 into the production tubing 103 to be transported uphole 114 to the surface.

Figure 2:
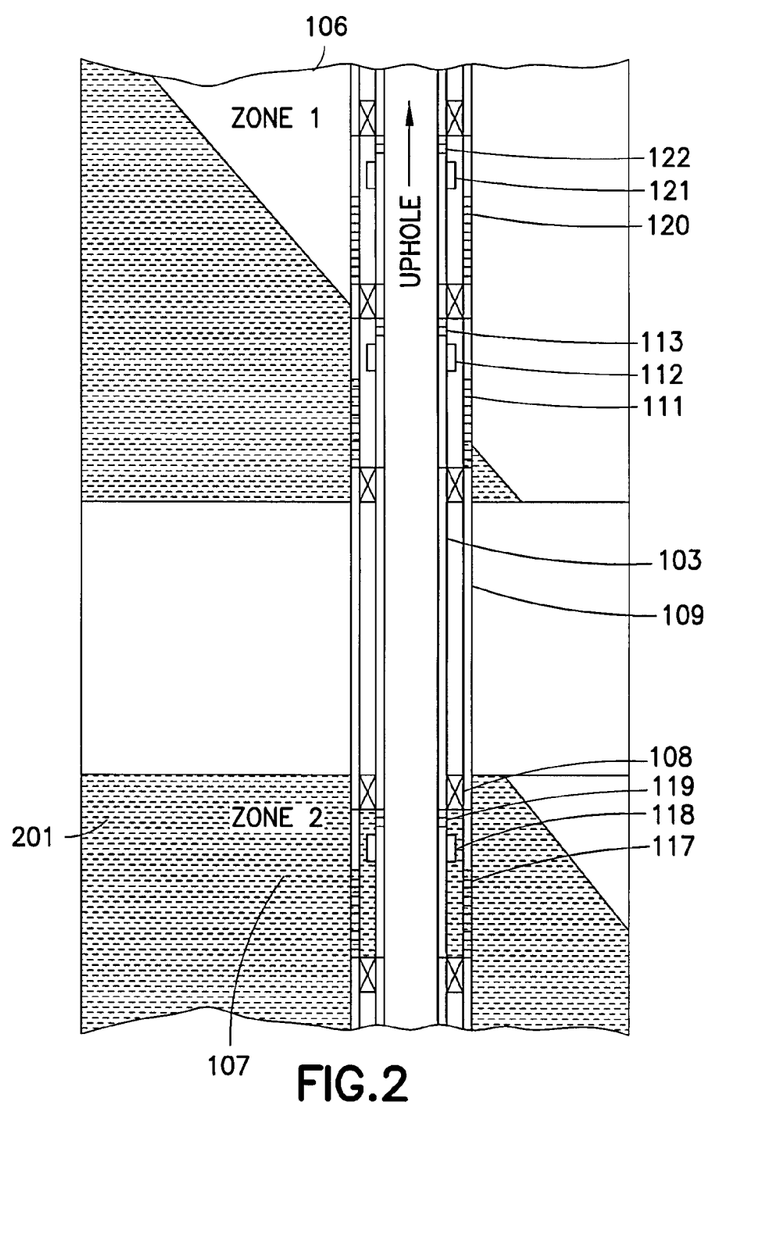
FIG. 2 is a side, cross-sectional view of an exemplary multi-zonal wellbore and production assembly which depicts zonal migration of undesirable fluids.

Referring generally to FIG. 2 as production of the well continues zonal migration of undesirable fluids, a phenomenon known as water crowning, begins to occur. This interzonal migration must be controlled. Referring to FIG. 2 zonal migration of water has flooded zone 2 107 while part of zone 1 106 near inflow control device 110 has experienced some migration of water. Zonal migration of undesirable fluids e.g. water 201 will move into the production tubing 103. Current techniques for detecting these undesirable fluids occurs uphole but it will be impossible to differentiate if the undesirable fluid is being transmitted from inflow control device 110, 115 or 116. If it is determined that a decrease of undesirable fluids is necessary production logging tools will be utilized to detect which inflow control devices 110, 115 and 116 the undesirable fluids are entering the production tubing from. On determining that fluid is entering the production tubing through inflow control device 110 and 115 intervention services (slickline, coiled tubing etc.) can be utilized to shut off the valves 112 and 118 of inflow control devices 110 and 115. These operations are expensive for wellbore operators, interrupt well production and impose potential risks of damaging the well completions. Many wells are left untreated, for these reasons, and this leads to suboptimal production of wellbores. The embodiments of the present invention aim to address the deficiencies of the prior art with regard to inflow control devices. The embodiments of the present invention automate the procedures described in FIGS. 1 and 2 utilizing swellable materials.

Figure 3:
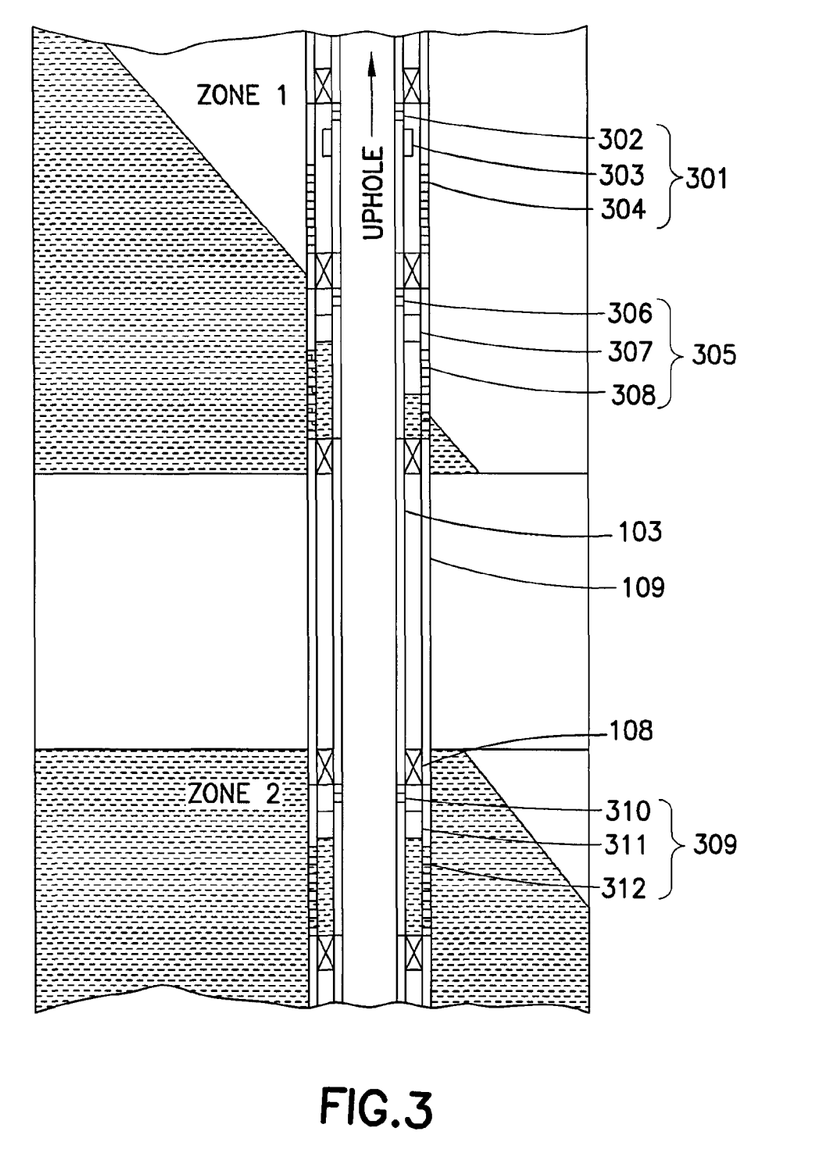
FIG. 3 is a side, cross-sectional view of an exemplary multi-zonal wellbore and production assembly which depicts zonal migration of undesirable fluids into the inflow control devices.

Referring generally to FIG. 3 when interzonal migration of undesirable fluids occur e.g. water and the water production at ports 306 and 310 increases the water entering from zone 106 and zone 107 will contact the swellable material in valve 311 and 307. The swellable material changes state from an unexpanded state to an expanded state when in contact with the water to close the valves 307 and 311. This closure of the valves closes the flow path between the screen 312 and port 310 and screen 308 and port 306. The inflow control devices of the present invention detect the undesirable fluids and close the valves that are producing undesirable fluids e.g. water without any intervention. The port 302 continues production into the production tubing 103 and uphole 114 without any interruptions. Closure of inflow control devices 305 and 309 has no impact on the producing ability of inflow control device 301 and the production of desirable hydrocarbons continues.

Figure 4:
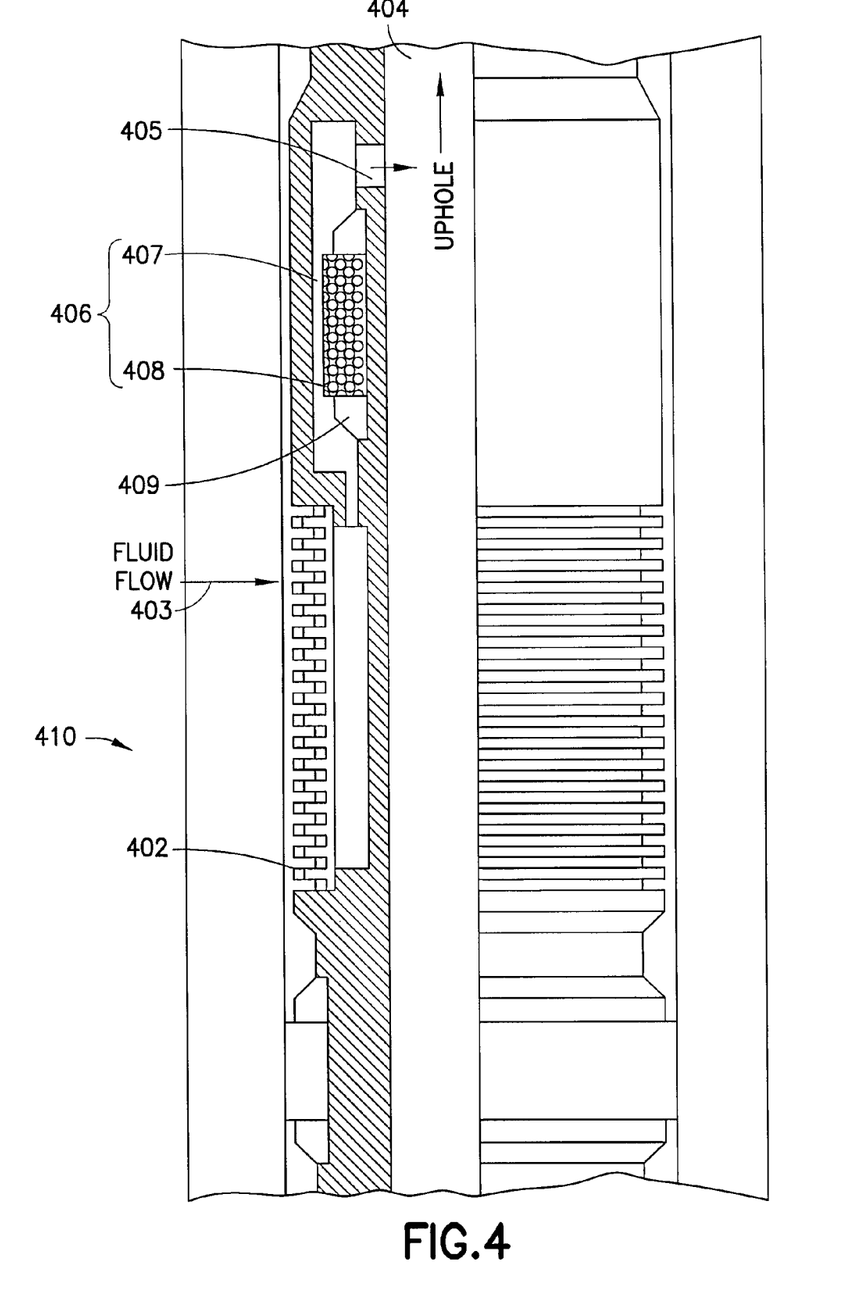
FIG. 4 illustrates an inflow control devices depicting an open operational state according to an embodiment of the invention.

FIG. 4 depicts one embodiment of the present invention. FIG. 4 depicts a cross-sectional view of the inflow control device 410. Formation fluids flow through the wellbore screen 402 into the valve assembly 406. The valve assembly 406 comprises a passage 407 and swellable material 408. This swellable material 408 can be polymers or composites. The swellable material 408 is disposed in a continuous band wrapped around a metal mandrel 409 which is used to confine the polymer and to guide the expansion of the swellable material in a radial direction. Formation fluid flows through the passage 407 and through the port 405 into the production stream 404. The swellable material 408 is formulated so that it is capable of an expanded state and an unexpanded state when the polymeric material is exposed to certain fluids. The swellable material 408 is formulated so that its configuration will change when exposed to certain fluids.

The inflow control device 410 functions in detecting the presence of undesirable fluids in the formation fluids 403. The swellable material 408 is formulated so that it swells only when there are pre-determined levels of undesirable fluids e.g. water but if the production fluids contain mainly hydrocarbons the swellable material 408 remains in an unexpanded state.

Thus, the embodiment in FIG. 4 describes the production fluid containing mainly hydrocarbons and the swellable material will remain in an unexpanded state. The valve assembly remains open and the formation fluid can flow through the passage 407 into the production stream 404 via the port 405.

Figure 5:
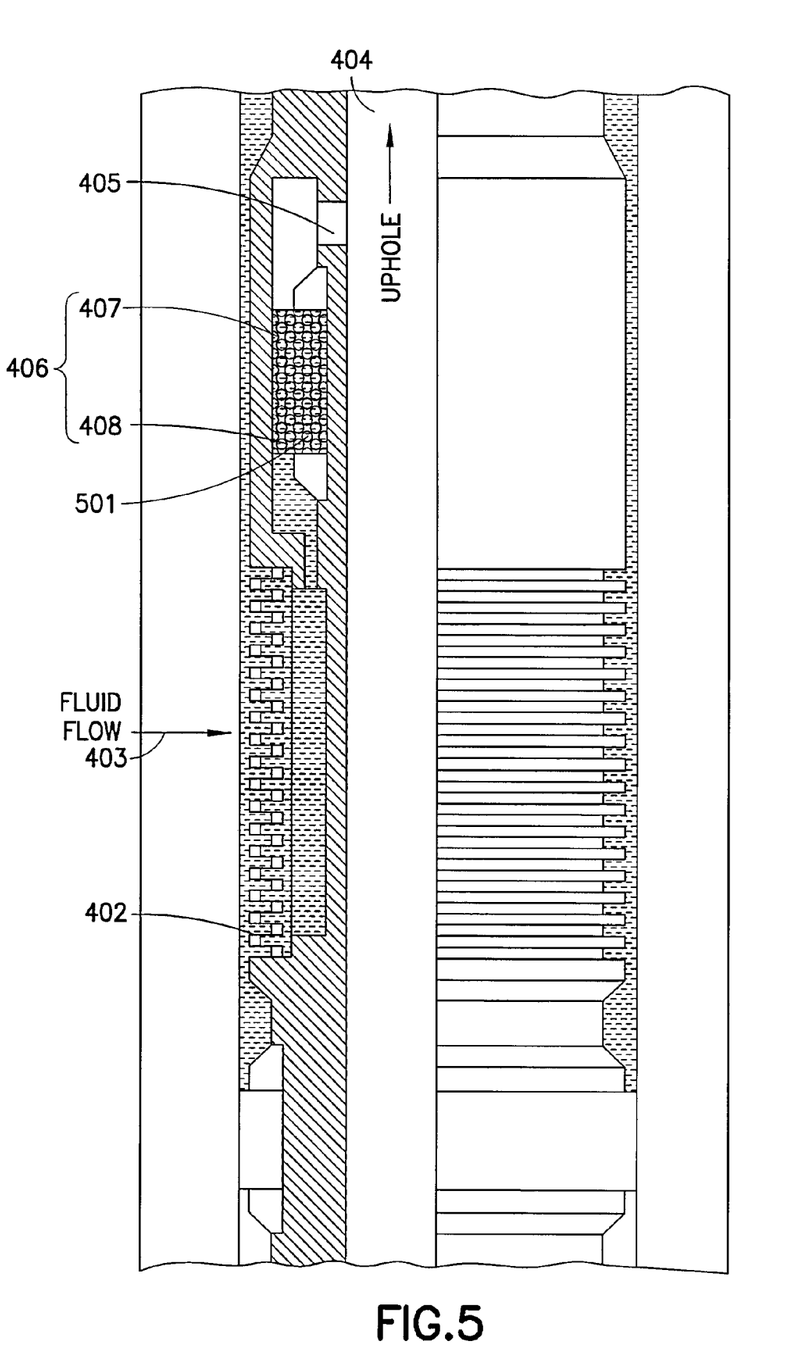
FIG. 5 illustrates an inflow control devices depicting a closed operational state according to an embodiment of the invention.

FIG. 5 illustrates an embodiment of the present invention where the inflow control device is now closed. When the production fluid 403 flows into the screen 402 the swellable material 408 will detect the presence of undesirable fluids and will absorb these fluids and the swellable material will modify its state to an expanded state. The location of the swellable material 408 allows for expansion of its volume radially outwards and the swellable material 408 expands until it blocks and seals the passage 407. The wellbore 402 may or may not include a casing. In FIGS. 4 and 5 the wellbore 402 does not include a casing. In either case, the swellable material 408 expands to adequately seal against the wellbore or casing. The location of the metal mandrel 409 ensures that the swellable material expands its volume radially outwards to seal the passage. Once this expansion occurs the passage 407 is blocked by the swellable material 408 and the valve assembly 406 is closed. The formation fluid 403 is therefore blocked from entering the port 405 and flowing into the production tubing 404. In this embodiment the valve assembly 406 automatically detects the undesirable fluids when these fluids reach a certain level. Once the valve assembly 406 detects a certain level of undesirable fluids the valve closes as the swellable material 408 absorbs the water and swells radially outwards blocking the passage 407. In this embodiment the swellable material 408 both functions as a detector of the fluids within the formation fluid 403 and also as a sealing element 501 expanding radially and blocking the passage 407 which closes the inflow control device.

The present embodiment encompasses swellable materials 408 which swells when the formation fluid's content increases to a certain level of undesirable fluids. If the formation fluid's content of undesirable fluids decreases the swellable material may revert from an expanded state to an unexpanded state. Once the swellable material returns to an unexpanded state the valve assembly 406 of the inflow control device 410 will open and the hydrocarbon production fluid will flow into the production tubing 404.

The present embodiment further encompasses swellable materials 408 which expand and close the passage 407 to stop undesirable production flow. In this case the valve assembly 406 is permanently closed or the valve can only be reopened through suitable intervention. The present embodiment further encompasses swellable material 408 which expands when the formation fluid's content of undesirable fluid increases. If the formation fluid's composition changes and the composition of undesirable fluids fall below the pre-defined limit the swellable material will remain expanded but de-swelling can be initiated and accelerated through the use of extraneous triggers. Triggers can be other fluids (that are either pumped in or released from a fluid reservoir located in the completion set-up), electric, magnetic or electromagnetic fields.

Figure 6:
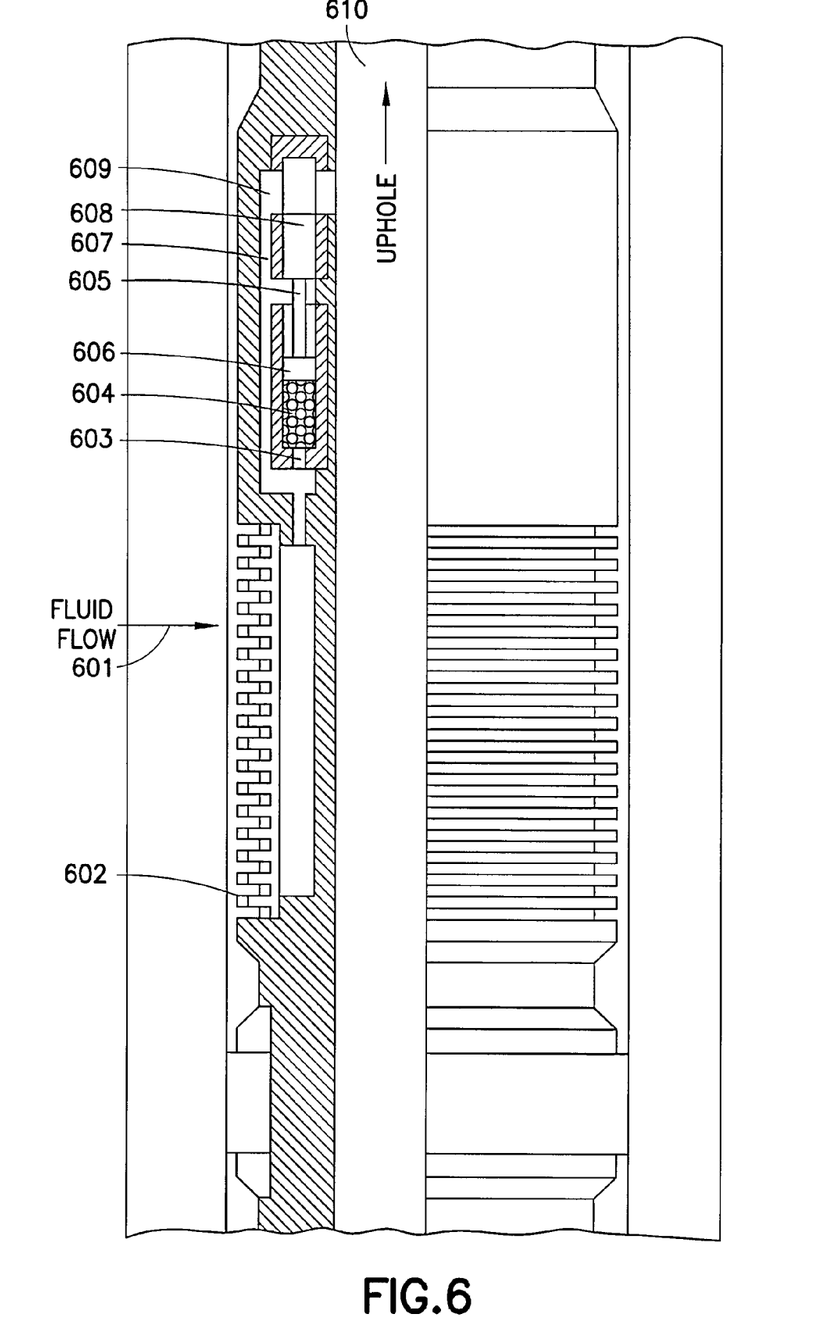
FIG. 6 illustrates an inflow control devices depicting an open operational state according to an embodiment of the invention.

FIG. 6 illustrates a further embodiment of the present invention. Formation fluid 601 flows through the screen 602 and into a housing which consists of channels or annulus 603 and 607. Channel 603 connects to the swellable material 604 so that the swellable material 604 is always exposed to the formation fluid. The swellable material 604 is confined between the channel 603 and the piston 606 so that the swellable material 604 expands its volume unidirectionally, in the case of our FIG. 6 to the left. Formation fluid enters the housing through channels 603 and 607. The piston 606 connects to the valve 608 via a rod 605. If the formation fluid 601 has not reached a pre-determined undesirable fluid level as shown in FIG. 6 the swellable material will not expand and the valve 608 remains open and therefore the port 609 is open and not blocked and the formation fluid 601 can flow from channel 603 through channel 607 via the port 609 and into the production tubing to be transported to the surface.

Figure 7:
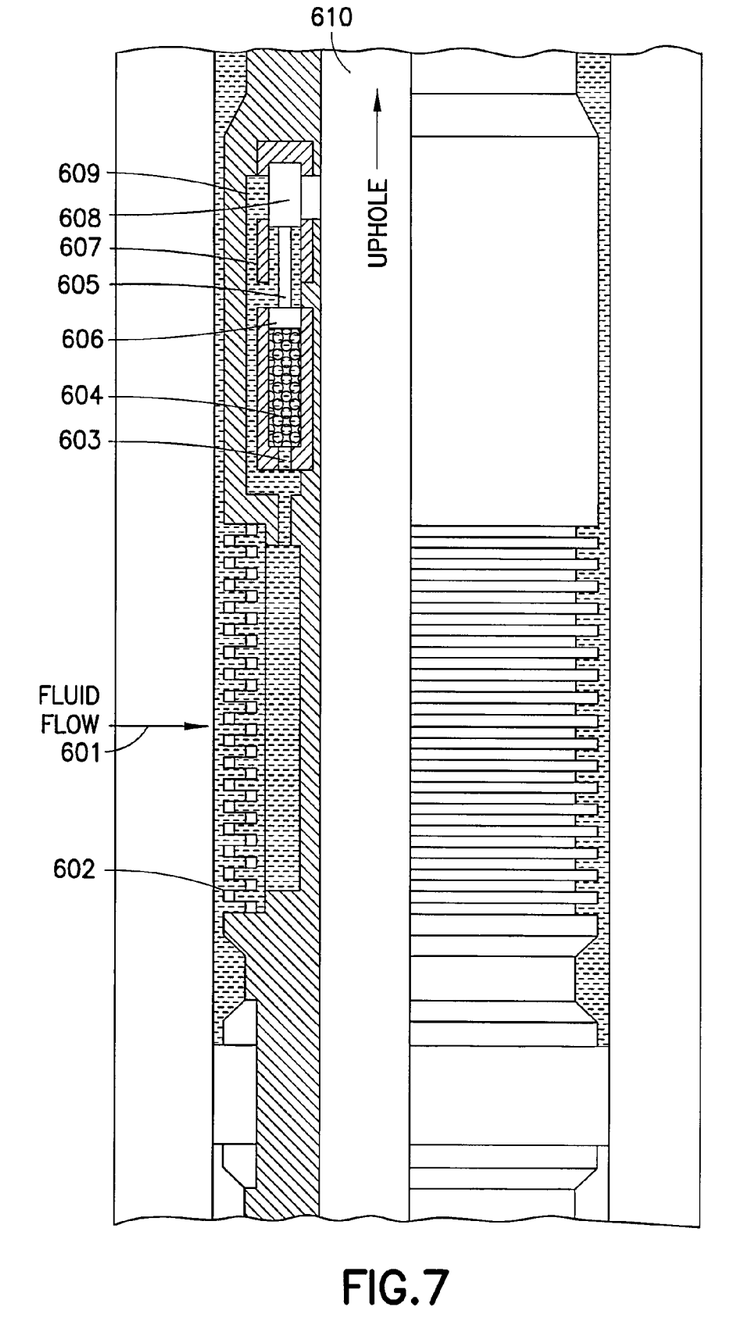
FIG. 7 illustrates an inflow control devices depicting a closed operational state according to an embodiment of the invention.

FIG. 7 illustrates the same embodiment of FIG. 6 with the inflow control device closed. Formation fluid 601 flows through the screen 602 and into the channel 603. Channel 603 connects to the swellable material 604 and when the swellable material 604 detects undesirable formation fluids the swellable material 604 will absorb the undesirable fluids and expand. The swellable material 604 is confined between channel 603 and the piston 606. Once the swellable material 604 detects the undesirable fluids it swells and expands its volume unidirectionally. This expansion or swelling of the material pushes the piston 606 which is connected to the rod 605 to the left in our embodiment as depicted in FIG. 7 which in turn pushes the valve 608 which eventually blocks and seals the port 609 and therefore closes the inflow control device. Once this occurs the valve 608 is closed and the formation fluid 601 cannot flow into the production stream via channel 607 and the port 609. The swellable material 604 detects the pre-determined undesirable fluid volume and expands automatically thereby pushing the piston to the left which in turn closes the valve 608. No intervention ever occurs to close the valve 608. The swellable material 604 in this embodiment functions simultaneously as a detector of undesirable fluids and an actuator providing force to move the piston 606 and rod 605 to actuate the valve 608. Similarly, if the swellable material 604 detects desirable fluids the material may change to an unexpanded phase thus reducing the force on the piston 606 and rod 605 which in turn will actuate the valve 608 and cause the valve to reopen allowing the production fluid to flow uphole 610.

Figure 8:
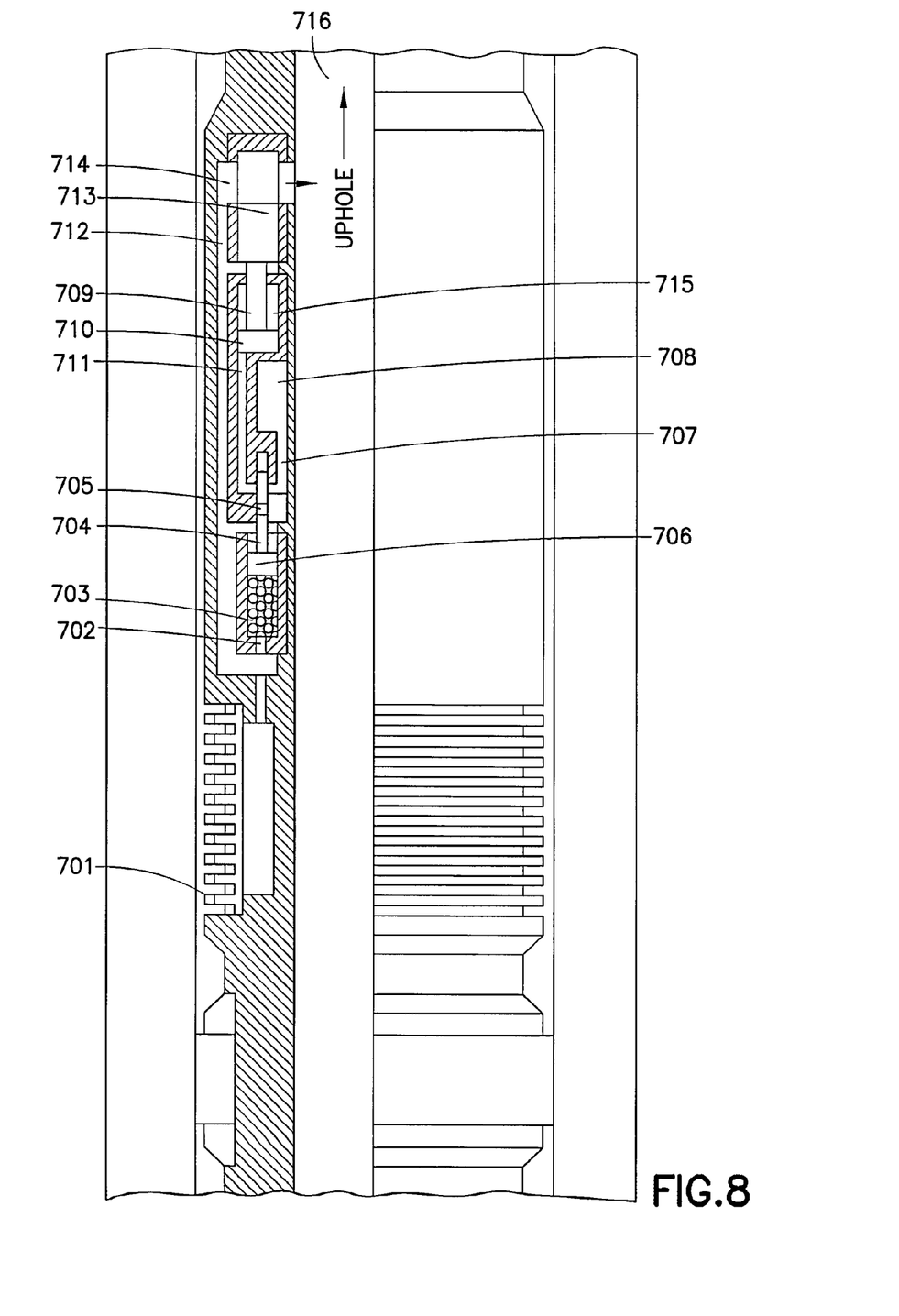
FIG. 8 illustrates an inflow control devices depicting an open operational state according to an embodiment of the invention.

FIG. 8 illustrates a further embodiment of the present invention. One issue that may arise with swellable material is the force the swellable material generates to actuate and displace the piston and therefore move the valve may not be very large. The embodiment of FIG. 8 addresses this issue. In FIG. 8 the swellable material is confined in a small volume. The problem with swellable material is the force that the swellable material generates when in an expanded state is usually not very large. In FIG. 8 the force generated by the swellable material in an expanded state moves a first piston. Movement of the first piston will initiate the release of pre-charged fluid from a chamber. The released pre-charged fluid will initiate a much larger force to move a second piston. Movement of the second piston will actuate the valve. The embodiment of FIG. 8 is a way of multiplying the force. The swellable material 703 in the present embodiment serves as both a detector of undesirable fluids and as a triggering device which controls the actuation of a much larger force to actuate the valve 713. Formation fluids enter the screen 701 and into both channels 702 and 712. The swellable material 703 is connected to the channel 702 and the swellable material 703 is confined between the channel 702 and the piston 706 so that the swellable material 703 expands its volume unidirectionally to the left in our embodiment in FIG. 8. The swellable material 703 will not swell in the presence of desirable fluids and therefore will not move the piston 706. The piston 706 is connected to a rod 704 which has an orifice 705. The production fluids will flow through the screen and into channels 702 and 712 and uphole 716 via the port 714. The valve 713 remains open as the swellable material 703 is in an unexpanded state as the formation fluid contains desirable fluids. When the fluid has not reached a predetermined undesirable level as shown in FIG. 8 the swellable material 703 will not expand and the orifice 705 will not align with channel 707 and channel 711. In this case the chamber 708 which may contain high pressure gas (e.g. nitrogen) will not release the pre-charged fluid into channel 711. The channel 711 is connected to a piston 710 which connects to a rod 709. The piston 711 is connected to the valve 713 via the rod 709. When the swellable material 703 has not expanded the valve 713 is open. The valve 713 remains open as there is no pre-charged gas released from the chamber 708 which would cause the piston 710 to move to the left in our embodiment in FIG. 8 and close the valve 713. The fluid can flow through 712 via the port 714 and uphole 716 into the production stream.

Figure 9:
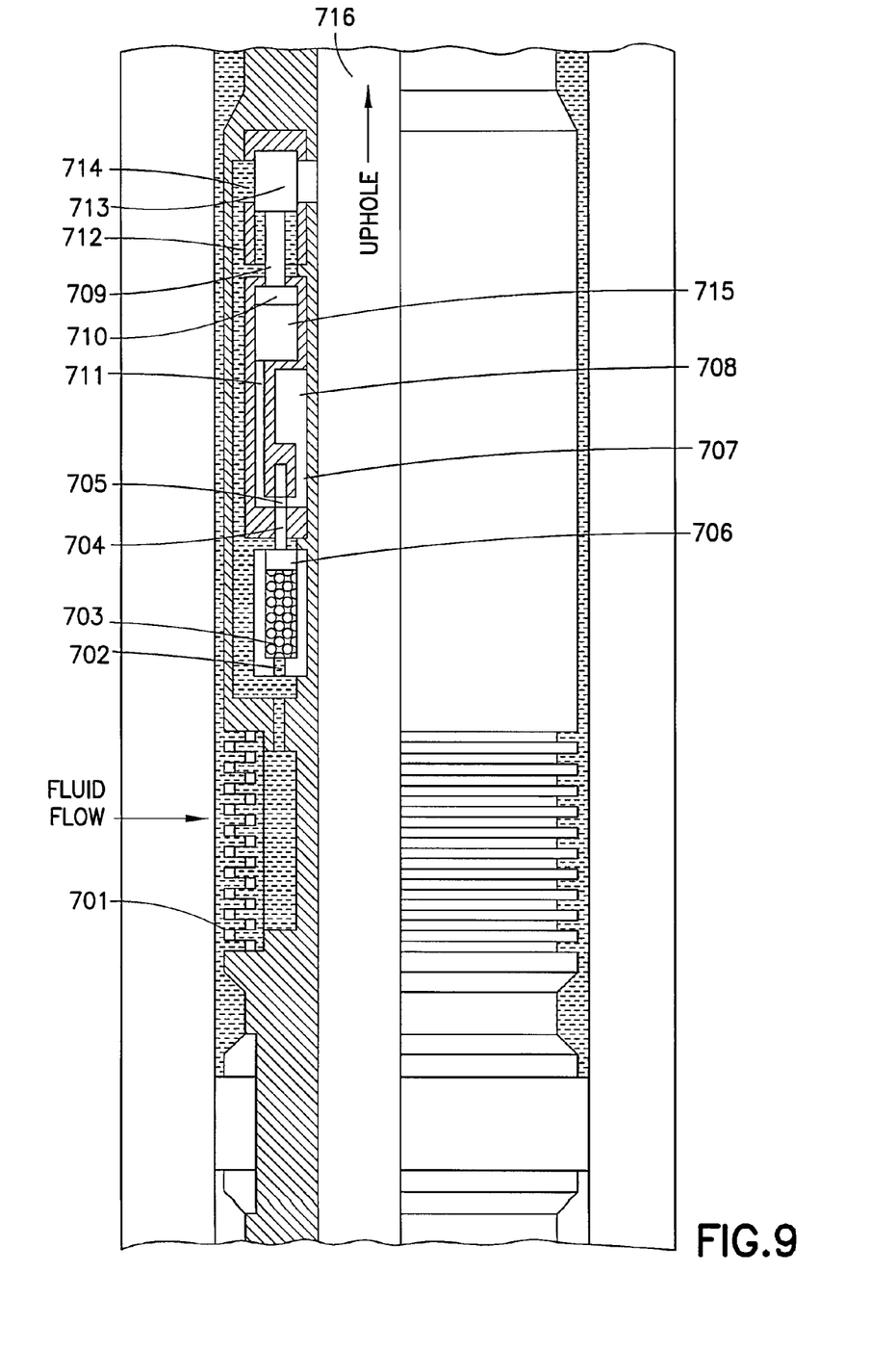
FIG. 9 illustrates an inflow control devices depicting a closed operational state according to an embodiment of the invention.

FIG. 9 depicts the embodiment of FIG. 8 in a closed position. When the fluids flowing into the channel 702 contain undesirable fluids the swellable material 703 will swell and expand. The swellable material 703 is confined between the channel 702 and the piston 706. As it swells it will expand its volume and push the piston 706 and the rod 704. Movement of the rod 704 will cause the orifice 705 to eventually align with both channels 707 and channel 711. When the orifice 705 aligns with the two channels this will allow the pre-charged fluid to be released from the chamber 708 via channel 707, the orifice 705 and the channel 711 into the piston chamber 715. The pre-charged fluid inside the piston chamber 715 will push the piston 710 and the rod 709 which in turn pushes the valve 713 to eventually close the port 714. Once the valve 713 is closed the formation fluid cannot flow into the production stream. The swellable material of the present embodiment automatically detects the predetermined undesirable fluid content. When this occurs the swellable material triggers the release of pre-charged fluid from the chamber into the piston chamber and this in turn shuts the valve. No intervention is needed to automatically open or close these valves.

Figure 10:
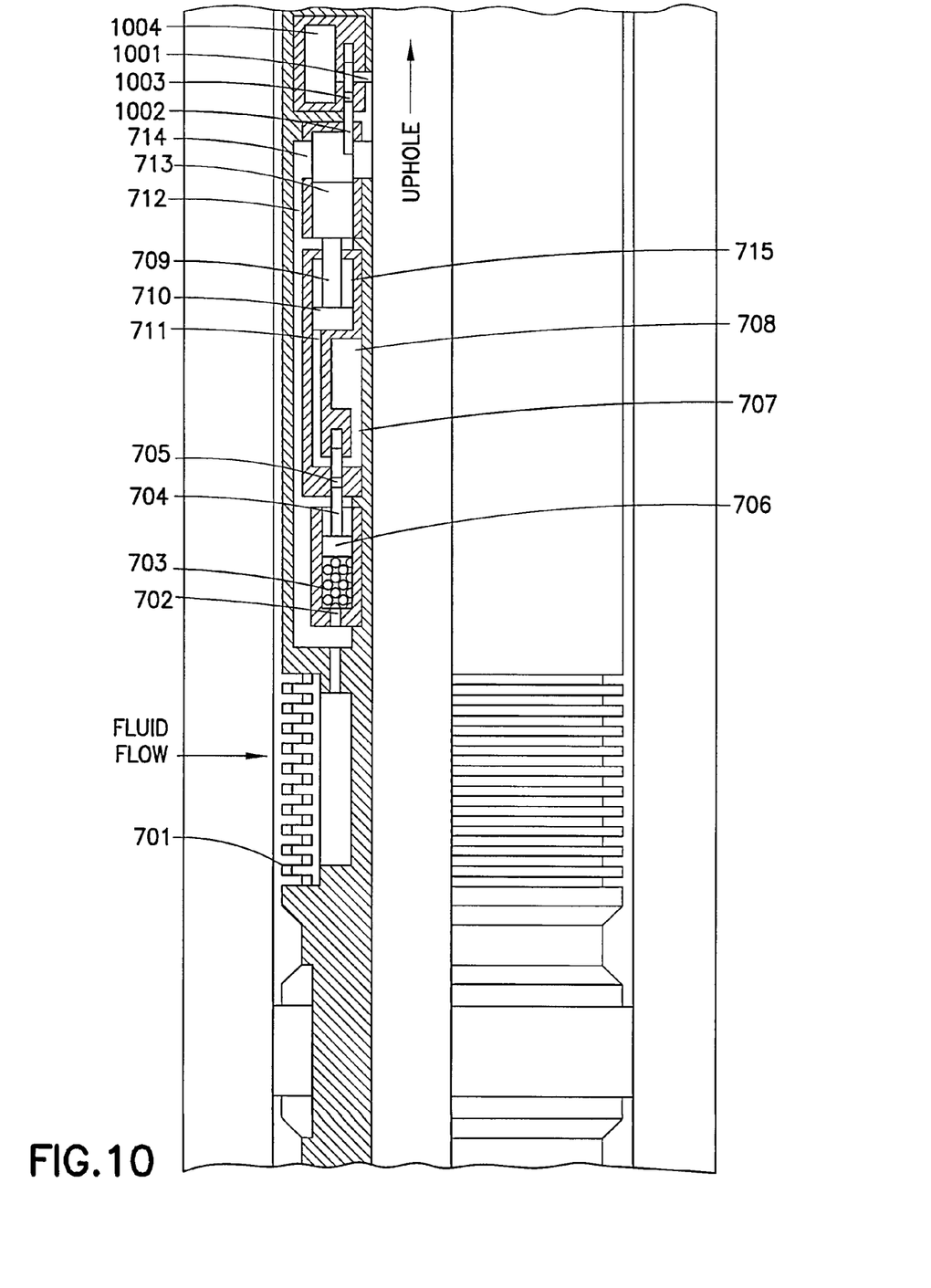
FIG. 10 illustrates an inflow control devices depicting an open operational state according to an embodiment of the invention.
Figure 11:
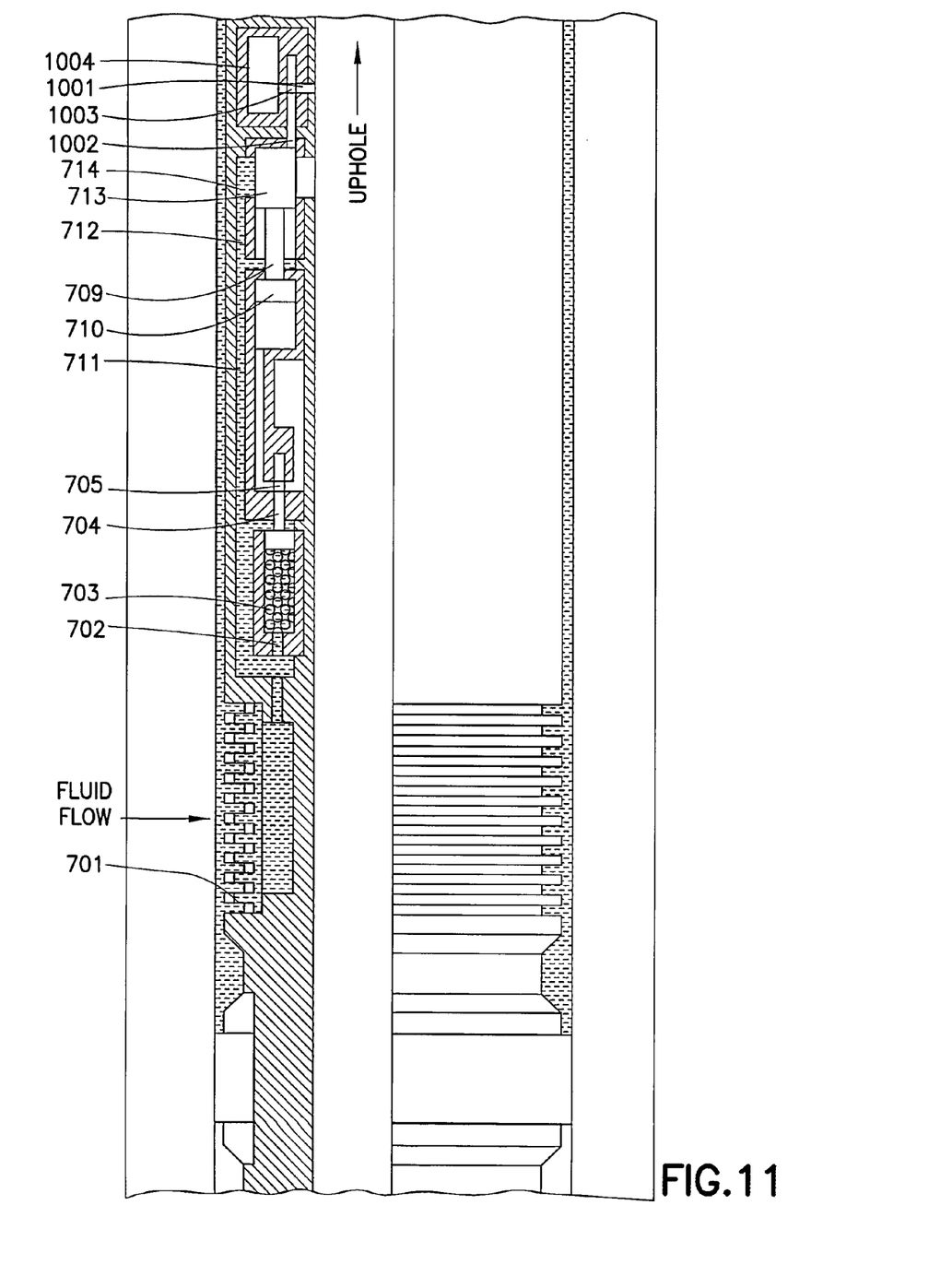
FIG. 11 illustrates an inflow control devices depicting a closed operational state according to an embodiment of the invention.

FIGS. 10 and 11 illustrates a further embodiment of the present invention utilizing many of the features of the embodiments as depicted in FIGS. 8 and 9. The embodiment can have a further chamber consisting of tracer elements unique to each inflow control device. The valve 713 when in the closed position will cause a further rod 1002 to move. This rod 1002 contains an orifice 1003 and when the rod 1002 moves the orifice 1003 aligns with the channel 1001. The tracer chamber 1004 is then opened and releases tracers, which can be among others chemicals, solid particles or beads. These tracers are released into the production stream via orifice 1003 and channel 1001. The operator at the surface can detect the tracers in the production flow and from these tracers can determine which inflow control devices are closed. If there are multiple inflow control devices as has been depicted in our embodiments each inflow control device can carry a unique tracer so that the operator can determine which inflow control devices have been shut off. These tracers can be liquid, solid or gas and are identifiable uphole due to their different "signatures". For example these tracers can be the rare earth dropped glass micro-barcodes as described in "Rare earth-doped glass microbarcodes, Dejnek et al., vol. 100, No. 2, Pages 389-393, Jan. 21, 2003".

In a further embodiment of the present invention the tracers may be embedded in the swellable material in the inflow control device valves or in swellable capsules that are exposed to the production fluid. At a certain level of undesirable production fluid composition the capsules will swell and release the tracer. The tracers can be arranged so that they are unique to each zone of the production tubing and therefore once released will notify the operator of impending increases in certain zones of undesirable fluids. The operator can therefore take certain action either through intervention or through the embodiments as described in the present invention.

The embodiments of the present invention can also use tube waves to send signals uphole. The tracer chamber 1004 of FIG. 10 could be replaced by a vacuumed or atmospheric chamber.

Whereas many alterations and modifications of the present invention will no doubt become apparent to a person of ordinary skill in the art after having read the foregoing description, it is to be understood that the particular embodiments shown and described by way of illustration are in no way intended to be considered limiting. Further, the invention has been described with reference to particular preferred embodiments, but variations within the spirit and scope of the invention will occur to those skilled in the art. It is noted that the foregoing examples have been provided merely for the purpose of explanation and are in no way to be construed as limiting of the present invention. While the present invention has been described with reference to exemplary embodiments, it is understood that the words, which have been used herein, are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A system for use in a wellbore having a plurality of well zones, comprising:
    a tubing disposed in the wellbore;
    a plurality of valves connected to the tubing;
    wherein each of the plurality of valves comprises:
        at least one port for communication between the tubing and one of the plurality of well zones,
        a first and a second channel, the first channel connected to a swellable material;
        a first piston connected to the swellable material;
        a first rod with an opening, the first piston connected to the first rod;
    wherein formation fluid flows from one of the plurality of well zones into the first and the second channel, the swellable material actuating the first piston when in contact with an undesirable formation fluid;
    wherein the first rod is movable by the first piston, the movable first rod causing the opening to align with a third and a fourth channel and release high pressure gas from a high pressure gas chamber into a piston chamber comprising a second piston and a second rod; and
    wherein one of the plurality of valves is movable by the second piston between an open position, wherein the at least one port is open, and a closed position, wherein the at least one port is closed.

2. The system of claim 1, wherein the swellable material swells unidirectionally.

3. The system of claim 1, wherein a closed valve can be reopened through intervention.

4. The system of claim 1, wherein a force generated by the swellable material is reduced when in contact with desirable fluids thus reopening a closed valve.

5. The system of claim 1, wherein the swellable material detects the presence of undesirable fluids in formation fluids.

6. The system of claim 1, wherein opening or closing one of the plurality of valves releases tracer elements.

7. The system of claim 6, wherein the tracer elements are released into the tubing.

8. The system of claim 6, wherein the tracer elements are selected from the group consisting of chemicals, solid particles, and beads.

9. The system of claim 6, wherein the tracer elements are embedded in the swellable material.

10. The system of claim 6, wherein the tracer elements are embedded in swellable capsules.

11. The system of claim 6, wherein the tracer elements are released when in contact with undesirable fluids.

12. The system of claim 6, wherein the tracer elements are unique to a production zone.

13. The system of claim 1, wherein opening or closing one of the plurality of valves releases signals uphole.

14. The system of claim 13, wherein the signals are tube waves.

15. A method for treating a wellbore having a plurality of well zones comprising:

disposing a tubing in the wellbore;
wherein the tubing has a plurality of valves, each having at least one port for communication between the tubing and one of the plurality of well zones,
a first and a second channel, the first channel connected to a swellable material;
a first piston connected to a first rod with an opening;
wherein formation fluid flows from one of the plurality of well zones into the first and the second channel;
actuating the first piston with the swellable material in contact with an undesirable formation fluid;
with the actuated first piston moving the first rod and aligning the opening with a third and a fourth channel causing a release of high pressure gas from a high pressure gas chamber into a piston chamber comprising a second piston and a second rod; and
moving one of the plurality of valves with the second piston between an open position, wherein the at least one port is open, and a closed position, wherein the at least one port is closed.

16. The method of claim 15, further including swelling the swellable material unidirectionally.

17. The method of claim 15, further including detecting the presence of undesirable fluids.

* * * * *